Rollin White
Revolver

No. 1,557, Reissued Oct. 27, 1863.

Witnesses:
J W Coombs
Geo W Reed

Inventor:
Rollin White
per Munn & Co
Attorneys

UNITED STATES PATENT OFFICE.

ROLLIN WHITE, OF SPRINGFIELD, MASS., (LATE OF HARTFORD, CONN.)

IMPROVEMENT IN REPEATING FIRE-ARMS.

Specification forming part of Letters Patent No. 12,649, dated April 3, 1855; Reissue No. 1,557, dated October 27, 1863.

*To all whom it may concern:*

Be it known that I, ROLLIN WHITE, formerly of the city and county of Hartford, and State of Connecticut, now of Springfield, in the county of Hampden and State of Massachusetts, have invented certain new and useful Improvements in Repeating Fire-Arms; and I do hereby declare that the following is a full, clear, and exact description of the same, reference being had to the accompanying drawings, forming part of this specification, in which—

Figure 1:
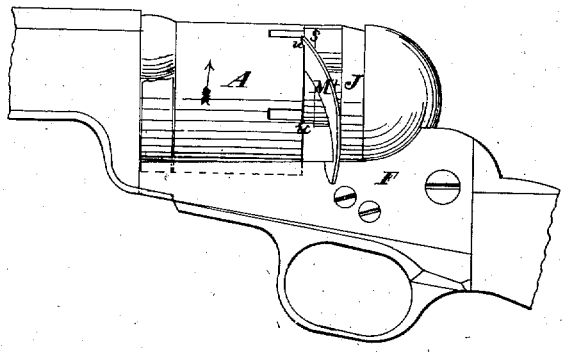
Figure 4:
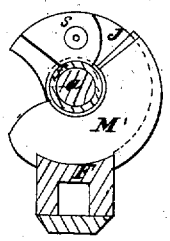
Figure 2:
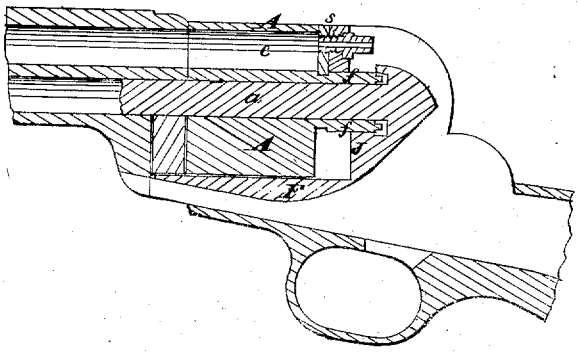
Figure 5:
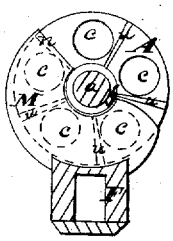
Figure 3:
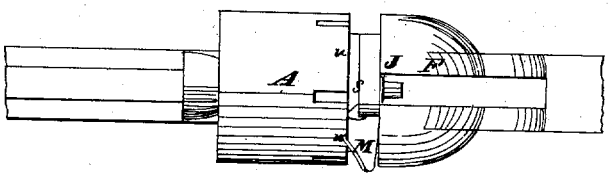

Figure 1 is a side elevation of a pistol on my improved plan. Fig. 2 is a central longitudinal vertical section of the same. Fig. 3 is a top view of the same. Fig. 4 is a front view of the recoil-shield and of a contrivance for forcing forward the cartridges into the cylinder and protecting the several chambers from lateral fire from the adjacent ones. Fig. 5 is a rear view of the cylinder and of a contrivance for forcing in the cartridges and protecting the chamber from lateral fire.

Similar letters of reference indicate corresponding parts in the several figures.

This invention relates to improvements in that class of fire-arms in which the charges or cartridges are inserted in a series of chambers formed in a cylinder, which is rotated that the charges may be brought in succession in line with a fixed barrel, there to be fired; and it consists in combining with the cylinder of such an arm, having the chambers extending through the rear end thereof, a breech-piece projecting forward of the face of a fixed or non-rotating recoil-shield and behind the barrel, for the purpose of keeping the charge or cartridge case, which is in that chamber of the cylinder for the time being in line with the barrel, in position during the discharge, giving support to the said charge or cartridge case in firing, and preventing the cartridge or case from swelling or projecting out at the rear, so that it shall not interfere with the rotation of the cylinder by rubbing against the portions of the recoil-shield which are not in line with the barrel.

It also consists in combining, with a revolving fire-arm having a rotating cylinder with the chambers extending through the rear end thereof, a non-rotating surface arranged in rear of the cylinder in a position oblique to the plane of the rear end of the said cylinder, for the purpose of forcing the cartridges forward in the chambers as their butt-ends are brought in contact with such oblique surface by the rotation of the cylinder; and it further consists, in combining with such a cylinder a spring protecting-plate arranged between the recoil-shield and the cylinder, having the chambers extending through, for the purpose of protecting the charges contained in the adjacent chambers from the effects of the fire if any should escape laterally from that chamber which is discharged in line with the barrel.

To enable others skilled in the art to make and use my invention, I will proceed to describe its construction and operation.

A is the cylinder, having its chambers *c c* extending through the rear end, and *a* is the central pin, upon which the cylinder rotates. J is the non-rotating recoil-shield, made of the same piece with or firmly secured to the frame E of the arm. S is the projecting breech-piece, made of the same piece with or otherwise secured or fitted to the recoil-shield J, and situated directly in line with and so as to be behind that chamber which for the time being is in line with the stationary barrel. The face of this projecting breech-piece does not require to be larger than is sufficient to form an abutment to the charge which is to be fired from that chamber which is in line with the barrel, that it may support the rear end of the charge or cartridge which is being fired, and thus also prevent the charge or cartridge, or any portion thereof, from being projected backward. As the face of the non-rotating recoil-shield is back of the plane of the face of this breech-piece, it will be evident that no portion of a charge or cartridge which has been fired can come in contact with the face of the recoil-shield to impede the further rotation of the cylinder; and it will be obvious that it is immaterial whether this projecting breech-piece be made separate from and attached to the recoil-shield, or whether it be made, in whole or in part, of the same piece of metal with the recoil-shield.

The cylinder is represented in the drawings as having the chambers of cylindrical form; but it is obvious that the projecting breech-piece is applicable in connection with cylinders having chambers of various forms with openings in their rear ends, so that the charges or cartridges can come in contact with the breech-piece when loaded or during the discharge.

At M will be seen the oblique surface in rear of the cylinder, for the purpose of forcing the cartridges forward in the chambers as they are brought in contact therewith by the rotation of the cylinder. This surface may be constructed in various ways; but in the example of my invention represented it consists of the front face of a plate, M, which is attached either to the lower part of the frame of the arm or to the recoil-shield, and which serves the additional purpose of protecting the rear ends of the chambers which are not in line with the barrel from the effects of lateral escape of fire from that chamber which is in line with the barrel. This plate, to answer both purposes herein specified, is made of spring-tempered steel or other equivalent metal, and may be of a width to make it cover that portion of the rear end of the cylinder outside of the hub-journal or concentric projection *f*, upon which are formed the teeth, which are acted upon by the dog attached to the hammer, or by other means, for the purpose of rotating the cylinder, and it may extend about half-way (more or less) round the cylinder in a circular form, as shown in Fig. 6. The said plate, independently of the function which it serves of protecting the chambers from the effects of lateral fire, has its front face oblique to the plane of the rear end of the cylinder, as represented in Fig. 1, when the arm is constructed so that the cylinder shall rotate in the direction of the arrow. I prefer to have it extend from the bottom to the breech-piece S with an elastic pressure, and may be formed with a beveled projection on the end, to enter one of a series of notches, *u u*, in the rear end of the cylinder when any one of the chambers is in line with the fixed barrel; but it will be obvious that for the purpose of forcing in the cartridges the plate M need not spring, and therefore does not require to be made with a projection to fit into grooves in the rear end of the cylinder.

By pressing against the cylinder and entering the notches *u u* the said protecting-plate prevents fire which may escape from the chamber in line with the barrel from passing to the loaded chamber which is next to be brought in line with the barrel and the breech-piece S.

What I claim as my invention, and desire to secure by Letters Patent, is—

1. A breech-piece projecting from the face of the recoil-shield opposite to the stationary barrel, substantially as described, in combination with the rotating cylinder having the chambers extended through the rear, as and for the purpose herein specified.

2. A non-rotating oblique surface, arranged in rear of and in combination with a rotating cylinder having its chambers extended through its rear, substantially as herein described, for the purpose of forcing forward the cartridges to their proper position in the chambers.

3. The spring protecting-plate, applied and operating, substantially as herein specified, at the rear of the cylinder, to protect the charges from the effects of lateral fire from the chamber in line with the barrel, in combination with a rotating chambered cylinder having the chambers extended through the rear, substantially as described.

ROLLIN WHITE.

Witnesses:
WM. K. BAKER,
J. M. COOLEY.